United States Patent Office 2,819,254
Patented Jan. 7, 1958

2,819,254
NEOPRENE CEMENT CONTAINING H₂S AS CURE ACCELERATOR

William E. Tann, Akron, Ohio, assignor to The Firestone Tire & Rubber Company, Akron, Ohio, a corporation of Ohio No Drawing. Application April 23, 1953
Serial No. 350,755

16 Claims. (Cl. 260—79.5)

This invention relates to improved neoprene (rubbery chloroprene polymer) cements and more particularly to vulcanizable neoprene cements containing a combination of stabilizing agents and vulcanization accelerators as specified herein. The term "cements" as used in this specification include coatings, paints and adhesives wherein a chloroprene polymer is dissolved or dispersed in a non-aqueous solvent.

Neoprene air-curing cements until the present invention underwent great increase in viscosity to attain a gelled state during storage before use. This gelled state was due to cross linking produced by curing agents, polymerization oxidation or by mechanism not completely understood. In any event such a gelled state renders the neoprene cement entirely useless for bonding surfaces. Gelling of neoprene cement during storage has been avoided before the present invention by manufacturing the cement in two parts and storing each part separately. A non-vulcanizing solvent base cement portion was formed by neoprene and modified ingredients such as zinc oxide and carbon black dispersed in a solvent but without a vulcanization accelerator. The base cement portion and the accelerator portion were stored separately until ultimate use. Whereupon the base cement and the accelerator portion were mixed and the resulting vulcanizable cement was applied immediately to surfaces to be bonded. Such two-part cement is cumbersome to store, ship and use. Moreover such cement is unsatisfactory particularly because in the event that all of the vulcanizable adhesive is not used immediately after the accelerator is added the portion not so used will gel and thus become unusable.

A proposal has been made to reduce the gelling tendency of neoprene cements by reducing the amount of vulcanization accelerator used therein. In order to form a satisfactory bond between two cemented surfaces it is necessary to vulcanize the cement, however, the use of a less quantity of accelerator requires that the step of vulcanizing the cement be increased an undesirable length of time. Moreover a reduction of the amount of accelerator in a cement reduces the strength of the vulcanized bond formed by such a cement.

The most successful of the prior art neoprene cements to resist gelling is compounded with a vulcanization accelerator combination of dibenzylamine and carbon disulfide. This cement, although having some resistance to gelling for short periods of time, has a very slow rate of vulcanization and for that reason is unsuitable for most applications, particularly those requiring an air-curing cement.

An object of the present invention is to provide a neoprene cement which will not gel under normal conditions of storage but which has a rapid rate of vulcanization.

Another object of the invention is to provide a neoprene cement which forms a vulcanized bond between two surfaces of greater strength than has heretofore been possible.

A further object of the invention is to provide a neoprene cement resistant to gelling during storage but capable of producing a stronger vulcanized bond between two surfaces in reduced vulcanization time.

These and other objects of the invention are obtained by providing a neoprene cement containing a concentration of hydrogen sulfide.

In order to test the cements of the invention, tests were made according to the following specifications:

OVEN TESTS

A container holding a sample of the cement to be tested is placed in an atmosphere of hot air at 158° F. or at room temperature (approximately 75° F.), and the time required for the appearance of a solid gel formation in the cement is recorded.

DEAD WEIGHT TEST

The surfaces of two strips of rubberized fabric 12 x 4¼ inches are cleaned with an aromatic solvent and a margin of at least ¾ of an inch along one long edge of each strip is cemented with the neoprene adhesive to be tested. The adhesive is allowed to dry and a second adhesive coat is applied and also allowed to dry. The two strips of fabric are pressed together to form a ¾ inch overlapping seam which is rolled out with a roller stitcher to produce intimate contact of the cemented surfaces and to expel air bubbles. The seams thus formed are air-cured at a desired temperature for the length of time of the test. Sample specimens two inches in width are cut at right angles to the seam. The test specimen is placed in an atmosphere of hot air at 140° F. and gripped parallel to the seam with self-aligning grips. A load is applied to the grips normal to the seam at a rate of 30 pounds per minute in an attempt to pull the seam apart. Results are reported in pounds of load and in time in minutes and seconds required for separation of the seam. Apparatus for the test is similar to that shown in Figure 4 of United States Air Force-Navy Aeronautical Specification MIL-C-5539 dated January 9, 1950. This specification requires an air-drying adhesive to cure within ten days and to have a minimum strength on dead weight test of 60 lbs. when tested at 140° F.

The above and other useful objects are attained by incorporating hydrogen sulfide in a solvent neoprene cement. The presence of hydrogen sulfide gives improved properties to a cement with or without other vulcanization accelerators.

In the preferred form of the invention a base cement stock is prepared according to the following formulation:

Base cement stock

| | |
|---|---|
| Neoprene* | 100 |
| EPC Black | 3 |
| Antioxidant | 2 |
| Total | 105 |

*Rubbery chloroprene polymer manufactured by E. I. du Pont de Nemours & Company such as neoprene GN, AC, KN and KNR.

Sufficient base cement stock is dissolved in a solvent such as toluene to yield a solvent base cement having a total solids concentration of 10% by weight. Hydrogen sulfide then is bubbled through the solvent base cement until the cement is saturated. A cement saturated with hydrogen sulfide gave the following results when tested as indicated.

Example 1

| | Sample No. | | |
|---|---|---|---|
| | 1 | 2 | 3 |
| Solvent Base Cement | 1 gal | 1 gal | 1 gal. |
| Hydrogen Sulfide | | Saturate | Saturate. |
| Zinc butyl xanthate | | | 6. |
| Dead Weight Test: | | | |
| (Aged 20 hrs. at 75° F.) Pounds to failure | No cure | 28 | 14. |
| (Aged 10 days at 75° F.) Pounds to failure | No cure | 64 | 23. |
| Days to gel in a 158° F. Oven | | | 11. |

From the above results it may be seen that the presence of hydrogen sulfide in the solvent cement made vulcanization possible. Where no hydrogen sulfide was present, no vulcanization took place showing hydrogen sulfide to be a vulcanization agent for air-curing neoprene cements. The cement need not be saturated with hydrogen sulfide to attain a cure, although saturation is preferred for the fastest rate of vulcanization possible.

Hydrogen sulfide also gives improved properties when used with other accelerators in an air-curing neoprene cement. Improvement in both gel resistance and rate of vulcanization are obtained when hydrogen sulfide is used with aliphatic or cycloaliphatic amines or a mixture of these amines with carbon disulfide as shown by the following tests:

Example 2

| | Sample No. | | |
|---|---|---|---|
| | 4* | 5* | 6* |
| Base Cement | 1 gal | 1 gal | 1 gal. |
| Dibenzylamine | 6.16 | 6.16 | 6.16. |
| Carbon disulfide | 22.6 | 22.6 | 22.6. |
| Zinc butyl xanthate | 6 | 6 | 6. |
| Hydrogen Sulfide | | Sat | Sat. |
| Dead Weight Test: | | | |
| (Aged 20 hrs. at 75° F.) Pounds to failure | 16 | 65 | 74. |
| (Aged 10 days at 75° F.) Pounds to failure | 76 | | |
| Days to gel at 158° F | 1 | 6 | 19. |

*All parts are by weight based on 100 parts of neoprene.

The above cements were prepared by dissolving base cement stock in toluene to obtain a total solids concentration of approximately 10% by weight. The carbon disulfide, zinc butyl xanthate and dibenzylamine were then stirred in as necessary to form the final vulcanizable cement.

The tests of Example 2 show that a cement using carbon disulfide and dibenzylamine as accelerators may be given improved gel resistance and an increased rate of vulcanization by the addition of hydrogen disulfide. Sample 5 demonstrates that the rate of vulcanization of cements saturated with hydrogen sulfide may be retarded by the use of zinc butyl xanthate. Sample 3 also shows the retarding effect on vulcanization of zinc butyl xanthate when used with hydrogen sulfide. Other amines work satisfactorily in the invention and particularly a mixture of aliphatic or cycloaliphatic amines with carbon disulfide. Examples of amines satisfactory for the use with carbon disulfide and hydrogen sulfide in the invention are diamylamine, triamylamine, tributylamine, dibutylamine, dipropylamine, tripropylamine, diethylamine, triethylamine, dimethylamine, trimethylamine, di-(2-ethylhexyl)-amine, and dibenzylamine. These amines may be used satisfactorily either singly or in a mixture with each other.

Cycloaliphatic amines suitable for use in the invention include cyclohexylamine and dicyclohexylamine. Also satisfactory are benzyl diethylamine, tri-n-propylamine and triethylamine.

As shown by the following example hydrogen sulfide acts to accelerate vulcanization and retard gel when used with accelerators of the aromatic heterocyclic type such as thiazoline and imidazoline types:

Example 3

| | Sample No. | | | | |
|---|---|---|---|---|---|
| | 7 | 8 | 9 | 10 | 11 |
| Base Cement | 1 gal | 1 gal | 1 gal | 1 gal | 1 gal. |
| Carbon Disulfide | 23.0 | 23.0 | 23.0 | 23.0 | 23.0. |
| Zinc butyl xanthate | 3.6 | 3.6 | 3.6 | 3.6 | 3.6. |
| Dibenzylamine | 3.7 | 3.7 | 3.7 | 3.7 | 3.7. |
| Diethylamine | 2.8 | 2.8 | 2.8 | 2.8 | 7.1. |
| 2-Mercaptothiazoline | 7.1 | 7.1 | | | |
| 2-Mercaptoimidazoline | | | 6.1 | 6.1 | |
| $H_2S$ | | Sat | | Sat | Sat. |
| Dead Weight Test: (Aged 20 hrs. at 75° F.) Pounds to failure | 32 | 102 | 37 | 107 | 135. |
| Days to gel at 158° F | 4 | 14 | 2 | 14 | 25. |

From a comparison of sample 7 with sample 8 and sample 9 with sample 10 it will be seen that the presence of hydrogen sulfide with mixed organic accelerators including thiazoline and imidazoline types not only increased rate of vulcanization but improved gel resistance greatly.

As shown by example 5 the presence of hydrogen sulfide improves an air-curing neoprene cement having an aldehyde-amine type accelerator.

Example 4

| | Sample No. | | | | | | |
|---|---|---|---|---|---|---|---|
| | 12 | 13 | 14 | 15 | 16 | 17 | 18 |
| Base Cement | 1 gal | 1 gal | 1 gal | 1 gal | 1 gal | 1 gal | 1 gal. |
| Accelerator 808* | | 6.9 | 6.9 | | | | |
| Accelerator 833** | | | | 6.2 | 6.2 | | |
| DOTG | | | | | | 7.2 | 7.2. |
| Hydrogen Sulfide | Sat | | Sat | | Sat | | Sat. |
| Dead Weight Test: | | | | | | | |
| (Aged 20 hrs. at 75° F.) Pounds to failure | 72 | 15 | 60 | 17 | 62 | 10 | 66. |
| (Aged 10 days at 75° F.) Pounds to failure | | 36 | | 88 | | 32 | |
| Days to gel at 158° F | No gel, 9. | 1 | No gel, 9. | 1 | No gel, 9. | No gel, 9. | No gel, 9. |

*Condensation product of butyraldehyde and analine.
**Condensation product of butyraldehyde and monobutyl-amine.
(Both manufactured by E. I. du Pont de Nemours & Co., Inc.)

In the above example (samples 14 and 16) the presence of hydrogen sulfide accelerated the cure rate and improved the gel resistance of the cements to which it was added. When added to a quanidine type accelerator such as the sample 17, hydrogen sulfide increased the rate of cure.

When hydrogen sulfide is used with accelerators of the amine, amino alcohol type, only relatively small proportions of the amino alcohol and of the alkylamine, based upon the neoprene content of the cements of the invention are required. The actual amounts of these amines utilized are in line with the amounts of vulcanization accelerators normally employed in neoprene cements. As is indicated above, carbon disulfide could be included in the cement with the amino alcohol and alkylamine, in a sufficient amount to form appreciable quantities of dithiocarbamate reaction products. Alternatively, as is brought out above, excess carbon disulfide is unnecessary in cement when the carbon disulfide reaction products of the amino alcohol and the alkylamine are utilized.

Although hydrogen sulfide may be passed into the cement as a gas, it is possible to use other methods of getting hydrogen sulfide into the cement. For example, the addition to the cement of certain chemicals which react to yield hydrogen sulfide is possible. Two chemicals satisfactory for addition to a polychloroprene cement to yield hydrogen sulfide are monoethanolamine and carbon disulfide. Other chemicals are well known to those skilled in the chemical art.

The term "chloroprene polymer" is used generically herein to include all commercial neoprenes. The term is used to include homopolymers of chloroprene as well as copolymers of chloroprene with sulfur and/or one or more unsaturated comonomers, including polymerizable ethylene compounds, such as styrene, acrylonitrile, vinylpyridine, vinyl chloride, vinylidene chloride, chlorotrifluoroethylene, and derivatives of these substances as well as other known monomers of the aliphatic and aromatic series of compounds; a conjugated diene, such as butadiene, isoprene, dichlorobutadiene and other known polymerizable dienes; and also polymerizable unconjugated polyenes, including pentadiene-1,4 and the like.

Among the known solvents useful for neoprene cements are aromatic solvents such as benzene, toluene, xylene and their homologues; ethylene dichloride, trichloroethylene, and other chlorinated hydrocarbon solvents; ester solvents, such as amyl acetate, butyl formate, butyl acetate, ethyl acetate and ethyl propionate; ketones, such as methyl ethyl ketone, isophorone and the like; mixtures of any of the above solvents with each other or with gasoline or the like; and commercial mixed solvents for neoprene known to the art.

I claim:

1. A fast-curing cement containing rubbery chloroprene polymer dissolved in a solvent and hydrogen sulfide as an accelerator.

2. A fast-curing cement containing rubbery chloroprene polymer dissolved in a solvent, a relatively small proportion of an organic accelerator and hydrogen sulfide.

3. A fast-curing cement containing rubbery chloroprene polymer dissolved in a solvent, a relatively small proportion of an aliphatic amine, and hydrogen sulfide.

4. A fast-curing cement containing rubbery chloroprene polymer dissolved in a solvent, a relatively small proportion of a cycloaliphatic amine and hydrogen sulfide.

5. A fast-curing cement according to claim 3 in which the aliphatic amine is dibenzylamine.

6. A fast-curing cement according to claim 3 in which the aliphatic amine is diethylamine.

7. A fast-curing cement according to claim 3 in which the aliphatic amine is di-isopropylamine.

8. A fast-curing cement according to claim 3 in which the aliphatic amine is t-butylamine.

9. A fast-curing cement according to claim 3 in which the aliphatic amine is dimethylamine.

10. A fast-curing cement according to claim 4 in which the cycloaliphatic amine is cyclohexylamine.

11. A fast-curing cement according to claim 4 in which the cycloaliphatic amine is dicyclohexylamine.

12. A fast-curing cement containing rubbery chloroprene polymer dissolved in a solvent, a relatively small proportion of an aromatic heterocyclic mercaptan and hydrogen sulfide.

13. A fast-curing cement according to claim 12 in which the aromatic heterocyclic mercaptan is mercaptothiazoline.

14. A fast-curing cement according to claim 12 in which the aromatic heterocyclic mercaptan is mercaptoimidazoline.

15. A method of making a fast-curing cement comprising the steps of dissolving a rubbery chloroprene polymer in a solvent and adding hydrogen sulfide.

16. A method of making a fast-curing cement comprising liberating hydrogen sulfide in a solution of a rubbery chloroprene until said solution is saturated with hydrogen sulfide.

No references cited.

UNITED STATES PATENT OFFICE
CERTIFICATE OF CORRECTION

Patent No. 2,819,254 January 7, 1958

William E. Tann

It is hereby certified that error appears in the printed specification of the above numbered patent requiring correction and that the said Letters Patent should read as corrected below.

Column 3, line 13, Example 1, in the table, third column thereof, last lin insert the numeral --11-- before the leaders.

Signed and sealed this 18th day of February 1958.

(SEAL)
Attest:
KARL H. AXLINE
Attesting Officer

ROBERT C. WATSON
Commissioner of Patents